US007779814B2

(12) United States Patent
Ishihara

(10) Patent No.: US 7,779,814 B2
(45) Date of Patent: Aug. 24, 2010

(54) FUEL INJECTION APPARATUS AND METHOD OF MANUFACTURING SAME

(75) Inventor: Akitaro Ishihara, Kariya (JP)

(73) Assignee: Denso Corporation, Kariya (JP)

( * ) Notice: Subject to any disclaimer, the term of this patent is extended or adjusted under 35 U.S.C. 154(b) by 438 days.

(21) Appl. No.: 11/498,764

(22) Filed: Aug. 4, 2006

(65) Prior Publication Data

US 2007/0028896 A1 Feb. 8, 2007

(30) Foreign Application Priority Data

Aug. 5, 2005 (JP) ............................ 2005-227758

(51) Int. Cl.
*F02M 57/02* (2006.01)
*B23Q 17/00* (2006.01)

(52) U.S. Cl. .................. 123/446; 29/407.01; 73/114.38

(58) Field of Classification Search ................. 123/446, 123/509; 29/407.01, 407.09, 407.1, 428; 73/119 A, 114.38, 114.32
See application file for complete search history.

(56) References Cited

U.S. PATENT DOCUMENTS 2,980,989 A * 4/1961 Malcolm ................. 29/888.01
3,941,493 A * 3/1976 Lagnitre ..................... 403/122
4,487,181 A 12/1984 Moore et al.
5,634,448 A * 6/1997 Shinogle et al. ............. 123/480
6,119,655 A 9/2000 Heinitz et al.
6,230,694 B1 * 5/2001 Cook et al. ............ 123/568.11
6,321,724 B1 * 11/2001 Winsor ....................... 123/509
6,330,877 B1 * 12/2001 Nordin ....................... 123/480
6,357,420 B1 * 3/2002 Matta ......................... 123/446
6,588,398 B1 7/2003 Rodier
6,932,059 B2 8/2005 Isogai (Continued)

FOREIGN PATENT DOCUMENTS

DE 198 02 583 8/1999

(Continued)

OTHER PUBLICATIONS

Japanese Office Action dated May 26, 2009, issued in counterpart Japanese Application No. 2005-227758, with English translation.

(Continued)

*Primary Examiner*—Thomas N Moulis
*Assistant Examiner*—J. Page Hufty
(74) *Attorney, Agent, or Firm*—Nixon & Vanderhye PC

(57) ABSTRACT

A fuel injection apparatus includes an accumulator, an injector, a fuel supplier supplying fuel to the accumulator, and a controller controlling a fuel supply rate of the fuel supplier through manipulation of a manipulated variable. The controller is configured to set a target fuel supply rate, determine a base target value of the manipulated variable as a first function of the target fuel supply rate, determine a correction value as a second function of the target fuel supply rate, correct the base target value of the manipulated variable using the correction value to obtain a final target value of the manipulated variable, and manipulate the manipulated variable to have the final target value, thereby bringing the fuel supply rate of the fuel supplier into agreement with the target fuel supply rate. The first and second functions are predefined prior to the installation of the fuel injection apparatus to an engine.

7 Claims, 3 Drawing Sheets

U.S. PATENT DOCUMENTS

| | | | | |
|---|---|---|---|---|
| 6,986,646 | B2 * | 1/2006 | Bettenhausen et al. | 417/53 |
| 2003/0111043 | A1 | 6/2003 | Rodier | |
| 2003/0194326 | A1 | 10/2003 | Bettenhausen et al. | |
| 2005/0103312 | A1 * | 5/2005 | Uchiyama | 123/457 |
| 2006/0120877 | A1 | 6/2006 | Bettenhausen et al. | |

FOREIGN PATENT DOCUMENTS

| | | |
|---|---|---|
| DE | 102 51 253 | 7/2003 |
| DE | 103 12 976 | 11/2003 |
| JP | 4-28901 | 5/1992 |
| JP | 2000-064882 | 2/2000 |
| JP | 2001-082230 | 3/2001 |
| JP | 1005-201141 | 7/2005 |

OTHER PUBLICATIONS

German Office Action dated Aug. 4, 2009, issued in corresponding German Application No. 10 2006 000 394.2-26, with English translation.

* cited by examiner

FUEL INJECTION APPARATUS AND METHOD OF MANUFACTURING SAME

CROSS-REFERENCE TO RELATED APPLICATION

This application is based on and claims priority from Japanese Patent Application No. 2005-227758, filed on Aug. 5, 2005, the content of which is hereby incorporated by reference into this application.

BACKGROUND OF THE INVENTION

1. Technical Field of the Invention

The present invention relates to fuel injection apparatuses or systems for injecting fuel into cylinders of internal combustion engines and methods of manufacturing the same.

2. Description of the Related Art

An existing fuel injection apparatus for a diesel engine includes an accumulator, a plurality of injectors, a fuel supply unit, and a controller. (Such an apparatus is disclosed, for example, in Japanese Patent First Publication No. 2001-82230.)

The accumulator is provided to store therein high-pressure fuel.

Each of the injectors is connected to the accumulator and works to inject the high-pressure fuel in the accumulator into one of a plurality of cylinders of the diesel engine.

The fuel supply unit works to supply the high-pressure fuel to the accumulator. The fuel supply unit includes a low-pressure pump connected to a fuel tank, a high-pressure pump connected to the accumulator, and a solenoid-controlled valve connected between the low-pressure and high-pressure pumps.

The low-pressure pump works to provide fuel from the fuel tank to the high-pressure pump. The high-pressure pump works to pressurize the fuel from the low-pressure pump to obtain the high-pressure fuel and provide the high-pressure fuel to the accumulator. The solenoid-controlled valve works to change, when supplied with electric current, the rate of fuel flow from the low-pressure pump to the high-pressure pump. In addition, the fuel leakages from the fuel supply unit and the injectors are configured to be returned to the fuel tank.

The controller works to control the fuel supply rate of the fuel supply unit (i.e., the rate of fuel flow from the low-pressure pump to the high-pressure pump) through manipulation of the electric current supplied to the solenoid-controlled valve. Specifically, the controller is configured to:

determine a target fuel supply rate of the fuel supply unit based on a target fuel pressure in the accumulator, determine a base target value of the electric current supplied to the solenoid-controlled valve as a first function of the target fuel supply rate, determine a correction value as a second function of the target fuel supply rate, correct the base target value of the electric current using the correction value to obtain a final target value of the electric current, and manipulate the electric current supplied to the solenoid-controlled valve to have the final target value, thereby bringing the fuel supply rate of the fuel supply unit into agreement with the target fuel supply rate.

The above configuration of the controller is derived from the following considerations.

In general, the fuel injection apparatus is manufactured as a member of a fuel injection apparatus group in mass production. Due to manufacturing tolerances, there exist slight differences in characteristics among the fuel supply units of different members of the group.

Accordingly, the first function is so defined to be used for all members of the fuel injection apparatus group, and the second function is individually defined for each member of the group to achieve accurate fuel supply rate control.

According to a conventional approach, the second function is defined by the controller during operation of the diesel engine at a specific condition (e.g., an idling condition).

However, as to be described hereinbelow, it is difficult for the controller to accurately define the second function during operation of the diesel engine.

FIG. 4 shows the relation between the electric current supplied to the Solenoid-Controlled Valve (to be referred to as SCV current hereinafter) and the fuel supply rate of the fuel supply unit.

The controller has a map stored therein, which represents the first function between the target fuel supply rate of the fuel supply unit and the base target value of the SCV current; the first function can also be represented by the line a-a in FIG. 4.

At an idling condition of the diesel engine, the controller first determines the base target fuel supply rate Q1, and then determines the base target value i1 of the SCV current by means of the map, as indicated by the point A in FIG. 4.

Further, the controller determines the actual value i2 of the SCV current, and then defines the second function as (i2−i1). In other words, the controller determines that the actual flow characteristics of the fuel supply unit are as indicated by the line b-b in FIG. 4.

The above definition of the second function is based on the assumption that the actual fuel supply rate of the fuel supply unit at the idling condition of the diesel engine is equal to the base target fuel supply rate Q1, as indicated by the point B in FIG. 4. However, when there is an excessive amount of the fuel leakages from the fuel supply unit and the injectors, the actual fuel supply rate Q2 may be greater than the target fuel supply rate Q1, as indicated by the point C in FIG. 4. In this case, the actual flow characteristics of the fuel supply unit are, in fact, as indicated by the line c-c in FIG. 4.

Since the actual fuel supply rate Q2 of the fuel supply unit is generally unknown to the controller during operation of the diesel engine, it is difficult for the controller to properly define the second function. Accordingly, it is difficult for the controller to accurately correct the base target value of the SCV current to secure the accuracy of the final target value of the same.

Consequently, the controller cannot bring the actual fuel supply rate of the fuel supply unit into agreement with the target fuel supply rate, and thus cannot accurately and quickly control the fuel pressure in the accumulator.

SUMMARY OF THE INVENTION

The present invention has been made in view of the above-mentioned problems.

It is, therefore, one object of the present invention to provide a fuel injection apparatus which can accurately control the fuel supply rate of a fuel supply unit thereof and the fuel pressure in an accumulator thereof.

It is another object of the present invention to provide a method of manufacturing the fuel injection apparatus as a member of a fuel injection apparatus group.

According to one aspect of the present invention, there is provided a fuel injection apparatus which includes an accumulator, an injector, a fuel supplier, and a controller.

The accumulator is provided to store therein pressurized fuel. The injector works to inject the pressurized fuel stored in the accumulator into a cylinder of an internal combustion engine. The fuel supplier works to supply the pressurized fuel to the accumulator. The controller works to control a fuel supply rate of the fuel supplier through manipulation of a manipulated variable on which the fuel supply rate is dependant. The controller is configured to:

set a target fuel supply rate, determine a base target value of the manipulated variable as a first function of the target fuel supply rate, the first function being predefined prior to installation of the fuel injection apparatus to the internal combustion engine, determine a correction value as a second function of the target fuel supply rate, the second function being also predefined prior to the installation of the fuel injection apparatus to the internal combustion engine, correct the base target value of the manipulated variable using the correction value to obtain a final target value of the manipulated variable, and manipulate the manipulated variable to have the final target value, thereby bringing the fuel supply rate of the fuel supplier into agreement with the target fuel supply rate.

With the above configuration, since both the first and second functions are predefined prior to the installation of the fuel injection apparatus to the internal combustion engine, it is possible to properly define the second function through tests on characteristics of the fuel supplier.

Consequently, it becomes possible for the controller to accurately correct the base target valve of the manipulated variable to secure the accuracy of the final target value of the same, thereby reliably bringing the actual fuel supply rate of the fuel supplier into agreement with the target fuel supply rate; accordingly, it also becomes possible for the controller to accurately and quickly control the fuel pressure in the accumulator.

According to another aspect of the present invention, there is provided a method of manufacturing a group of fuel injection apparatuses, which includes:

(a) preparing an accumulator, at least one injector, a fuel supplier, and a controller for each member of the group, wherein:

the accumulator is employed to store therein pressurized fuel, the injector is employed to inject the pressurized fuel stored in the accumulator into a cylinder of an internal combustion engine, the fuel supplier is employed to supply the pressurized fuel to the accumulator, and the controller is employed to control a fuel supply rate of the fuel supplier through manipulation of a manipulated variable on which the fuel supply rate is dependant, the controller being configured to:

set a target fuel supply rate, determine a base target value of the manipulated variable as a first function of the target fuel supply rate, determine a correction value as a second function of the target fuel supply rate, correct the base target value of the manipulated variable using the correction value to obtain a final target value of the manipulated variable, and manipulate the manipulated variable to have the final target value, thereby bringing the fuel supply rate of the fuel supplier into agreement with the target fuel supply rate;

(b) defining the first function which is to be used for all members of the group;

(c) testing the fuel supplier for each member of the group to determine characteristics of the fuel supplier;

(d) defining, based on the determined characteristics of the fuel supplier, the second function for each member of the group;

(e) storing the defined first and second functions in the controller for each member of the group; and (f) assembling together the accumulator, the at least one injector, the fuel supplier, and the controller for each member of the group.

With the above method, it is possible to reliably and efficiently manufacture the fuel injection apparatus group each member of which has the above-described advantages of the fuel injection apparatus according to the present invention.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

Figure 1:
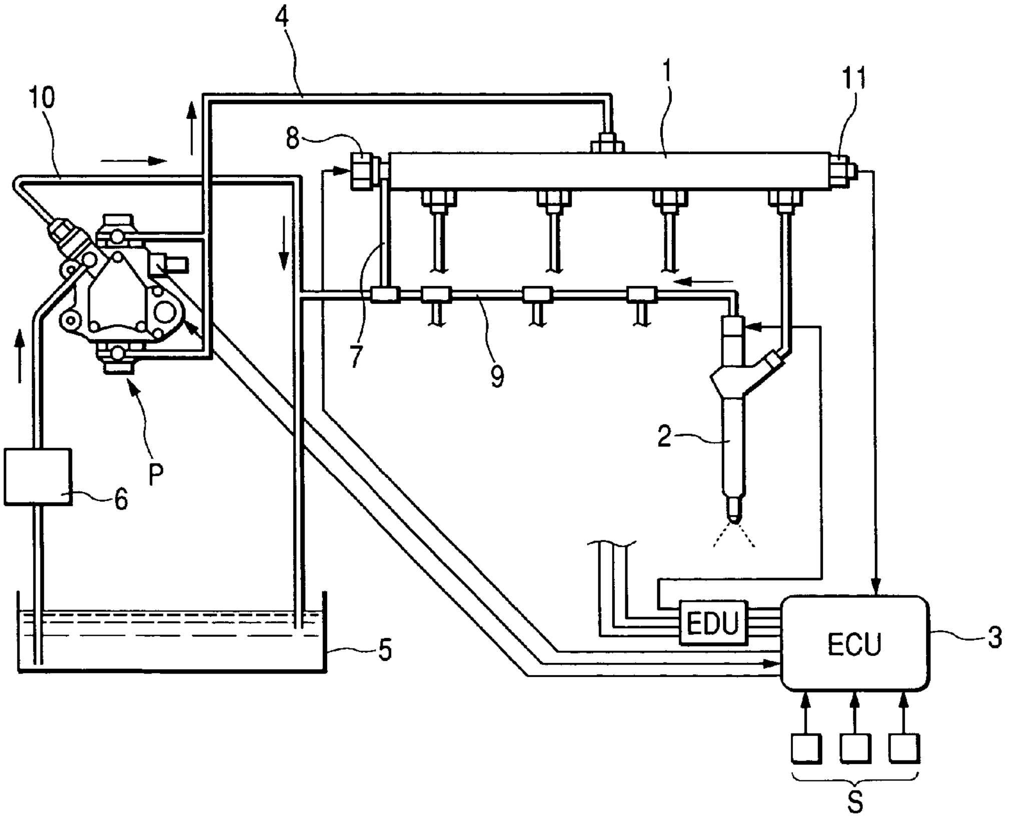
FIG. 1 is a schematic view showing the overall configuration of a fuel injection apparatus according an embodiment of the invention.

The preferred embodiment of the present invention will be described hereinafter with reference to FIGS. 1-3.

It should be noted that, for the sake of clarity and understanding, identical components having identical functions have been marked with the same reference numerals in each of the figures.

FIG. 1 shows the overall configuration of a fuel injection apparatus according to an embodiment of the present invention. The fuel injection apparatus is designed to inject fuel into four cylinders of a diesel engine.

As shown in FIG. 1, the fuel injection apparatus includes an accumulator (or common rail) 1, four injectors 2, a fuel supply unit P, and an ECU (Electronic Control Unit) 3. It should be noted that for the sake of simplicity, only one of the injectors 2 is illustrated in FIG. 1.

The accumulator 1 is provided to store therein high-pressure fuel. To the accumulator 1, there is connected a relief flow path 7 for retuning the high-pressure fuel in the accumulator 1 to a fuel tank 5. Further, in the relief flow path 7, there is provided a solenoid-controlled valve 8 that works to open and close the relief flow path 7. More specifically, the open/close operation of the solenoid-controlled valve 8 is controlled by the ECU 3 to reduce the fuel pressure in the accumulator 1 when the diesel engine decelerates or makes a halt.

Each of the injectors 2 is connected to the accumulator 1 and works to inject the high-pressure fuel in the accumulator 1 into one of the four cylinders of the diesel engine. It is to be appreciated that the fuel injection apparatus may have a different number of injectors according to the number of cylinders of the diesel engine for which it serves. To each injector 2, there is connected a recovery flow path 9 for returning a fuel leakage from the injector 2 to the fuel tank 5.

The fuel supply unit P works to draw fuel from the fuel tank 5 via a filter 6, pressurize the drawn fuel to obtain the high-pressure fuel, and provide the high-pressure fuel to the accumulator 1 via a high-pressure flow path 4.

Figure 2:
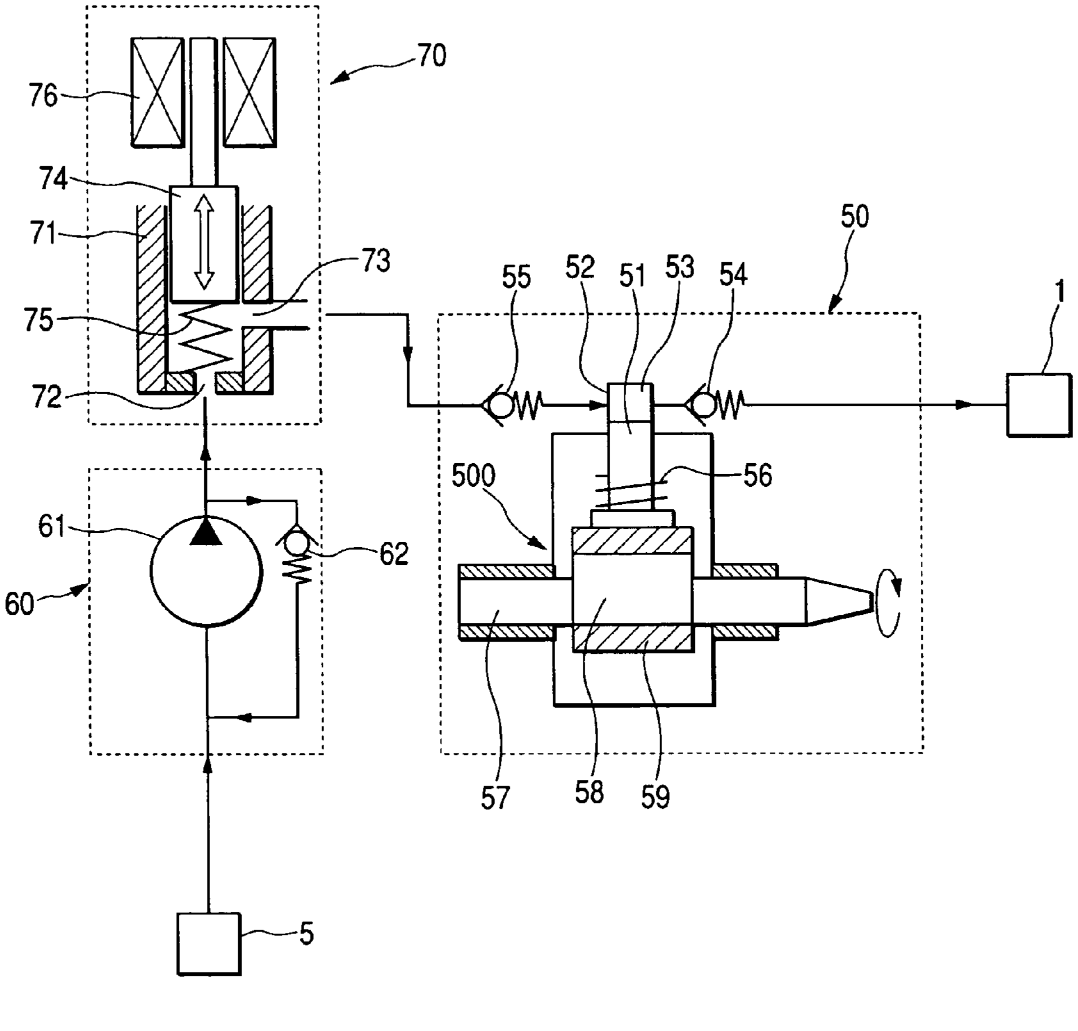
FIG. 2 is a schematic view showing the detailed configuration of a fuel supply unit of the fuel injection apparatus in FIG. 1.

Specifically, referring to FIG. 2, the fuel supply unit P includes a low-pressure pump 60 connected to the fuel tank 5, a high-pressure pump 50 connected to the accumulator 1, and a solenoid-controlled valve 70 connected between the low-pressure pump 60 and the high-pressure pump 50.

The low-pressure pump 60 includes a pump portion 61 and a relief valve 62. The pump portion 61 is configured to be driven by the diesel engine or an automotive motor to draw fuel from the fuel tank 5 and provide the drawn fuel to the high-pressure pump 50 under low pressure. The relief valve 62 works to regulate pressure of the fuel discharged from the pump portion 61, so as to keep the pressure from exceeding a predetermined threshold.

The high-pressure pump 50 includes a plunger 51 and a cylinder 52, which together form a pressure chamber 53 therebetween. The plunger 51 is configured to be reciprocated in the cylinder 52 by a drive unit 500, thereby pressurizing the fuel which flows from the low-pressure pump 60 via the solenoid-controlled valve 70 into the pressure chamber 53. The high-pressure fuel obtained by the pressurization is discharged from the pressure chamber 53 via a check valve 54 to the accumulator 1. The check valve 54 is provided to prevent a reverse fuel flow from the accumulator 1 to the pressure chamber 53. On the other hand, a check valve 55 is provided on the inlet side of the pressure chamber 53 to prevent a reverse fuel flow from the pressure chamber 53 to the solenoid-controlled valve 70.

The drive unit 500 includes a drive shaft 57, a cam 58, and a cam ring 59. The drive shaft 57 is connected to a clank shaft of the diesel engine, so that it can be rotated by the diesel engine. The cam 58 is eccentrically fitted on the drive shaft 57, so that it can rotate with rotation of the drive shaft 57. The cam ring 59 receives therein the cam 58 via a metal bush (not shown), so that it can rotate with rotation of the cam 58. Further, the plunger 51 of the high-pressure pump 50 is urged by a spring 56 to make contact with the cam ring 59, so that it can reciprocate in the cylinder 52 with rotation of the cam ring 59.

The solenoid-controlled valve 70 works to change, when supplied with electric current, the rate of fuel flow from the low-pressure pump 60 to the high-pressure pump 50.

More specifically, the solenoid-controlled valve 70 includes a cylindrical housing 71, a plunger 74, a spring 75, and a solenoid 76. The housing 71 has an inlet port 72 connected to the low-pressure pump 60 to receive the fuel discharged from the low-pressure pump 60 and an outlet port 73 connected to the high-pressure pump 50 to provide the received fuel to the high-pressure pump 50. The plunger 74 is slidably accommodated in the housing 71 such that the open area of the outlet port 73 is dependant on the position of the plunger 74 in the axial direction of the housing 71. The spring 75 is also accommodated in the housing 71, so as to urge the plunger 74 in a direction to increase the open area of the outlet port 73 of the housing 71. The solenoid 76 works to generate, when supplied with electric current, an electromagnetic force which moves the plunger 74 in a direction to decrease the open area of the outlet port 73 of the housing 71. Consequently, the open area of the outlet port 73 of the housing 71 is dependant on the electric current supplied to the solenoid 76; when the electric current supply to the solenoid 76 is stopped, the spring 75 returns the plunger 74 to its initial position at which the outlet port 73 of the housing 71 is fully opened.

Additionally, referring again to FIG. 1, a recovery flow path 10 is connected to the fuel supply unit P to return a fuel leakage from the fuel supply unit P to the fuel tank 5.

The ECU 3 includes a microcomputer (not shown) of a well-know type, which is configured with a CPU, a ROM, a RAM, and I/O devices. The ECU 3 is configured to implement predetermined processes according to a program installed in the microcomputer.

Specifically, the ECU 3 receives a fuel pressure signal outputted from a fuel pressure sensor 11, which represents the fuel pressure in the accumulator 1. The ECU 3 also receives various sensing signals from various sensors S, such as an engine rotational speed signal from an engine rotational speed sensor and a throttle position signal from a throttle position sensor.

Then, the ECU 3 determines an optimal injection time and an optimal injection quantity (i.e., an optimal duration of injection) for each of the injectors 2, based on the received sensing signals. Further, the ECU 3 controls each of the injectors 2 to inject the high-pressure fuel in the accumulator 1 into the corresponding one of the four cylinders of the diesel engine at the optimal injection time for the optimal duration of injection. The ECU 3 also controls the open/close operation of the solenoid-controlled valve 8 based on the received sensing signals.

Moreover, the ECU 3 controls the fuel supply rate of the fuel supply unit P (i.e., the rate of fuel flow from the low-pressure pump 60 to the high-pressure pump 50) through manipulation of the electric current supplied to the Solenoid-Controlled Valve 70 (to be referred to as SCV current hereinafter) in the following way.

First, the ECU 3 determines a target fuel supply rate of the fuel supply unit P, based on a target fuel pressure in the accumulator 1, the optimal injection quantities of the injectors 2, and estimated values of the fuel leakages from the injectors 2 and the fuel supply unit P.

Secondly, the ECU 3 determines a base target value of the SCV current as a first function of the target fuel supply rate.

Figure 3:
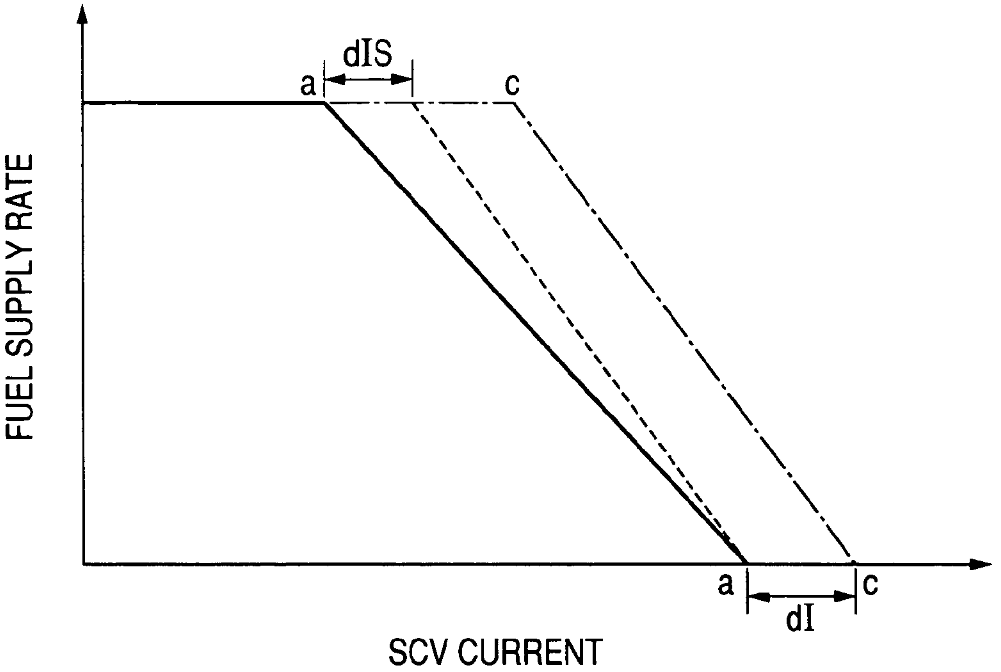
FIG. 3 is a graphical representation showing the relation between the electric current supplied to a solenoid-controlled valve of the fuel supply unit and the fuel supply rate of the fuel supply unit in the fuel injection apparatus of FIG. 1.
Figure 4:
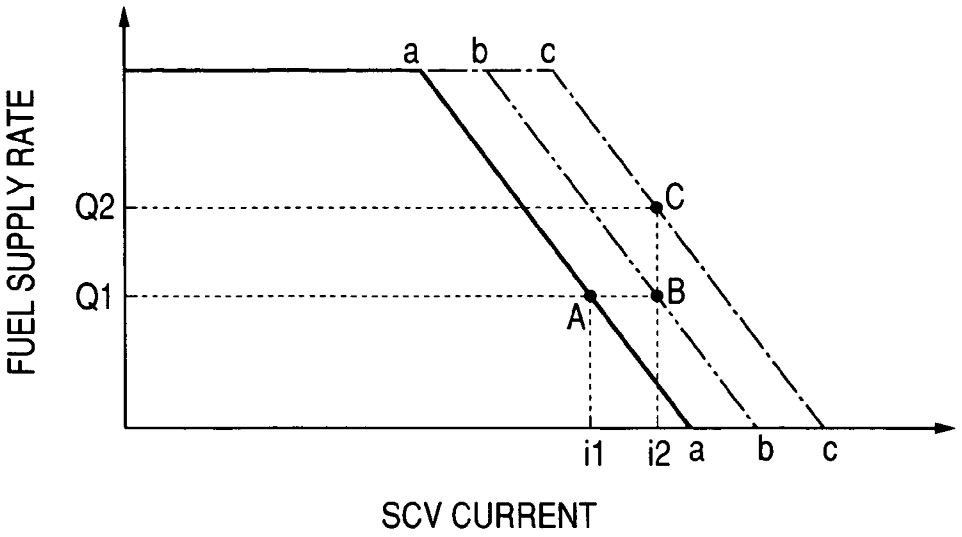
FIG. 4 (PRIOR ART)
FIG. 4 is a graphical representation showing the relation between the electric current supplied to a solenoid-controlled valve of a fuel supply unit and the fuel supply rate of the fuel supply unit in a prior art fuel injection apparatus.

FIG. 3 shows the relation between the SCV current and the fuel supply rate of the fuel supply unit P. In the figure, the line a-a represents the first function between the target fuel supply rate of the fuel supply unit P and the base target value of the SCV current.

In this embodiment, the first function is predefined prior to the installation of the fuel injection apparatus to the diesel engine, and the ECU 3 has stored therein a map which represents the first function.

Thirdly, the ECU 3 determines a correction value as a second function of the target fuel supply rate of the fuel supply unit P.

When the actual flow characteristics of the fuel supply unit P are as indicated by the line c-c in FIG. 3, the second function can be defined as (dI+dIS), where dI is constant irrespective of the target fuel supply rate and dIS varies with the target fuel supply rate.

In this embodiment, the second function (i e., dI and dIS) is also predefined prior to the installation of the fuel injection apparatus to the diesel engine, and the ECU 3 has stored therein the value of dI and a map which represents dIS.

Fourthly, the ECU 3 corrects the base target value of the SCV current using the correction value to obtain a final target value of the SCV current.

Finally, the ECU 3 manipulates the SCV current to have the final target value, in other words, supplies electric current having the final target value to the solenoid-controlled valve 70, thereby bringing the actual fuel supply rate of the fuel supply unit P into agreement with the target fuel supply rate.

More specifically, when the electric current having the final target value is supplied to the solenoid 76 of the solenoid-controlled valve 70, the solenoid 76 creates the electromagnetic force having a corresponding magnitude. The electromagnetic force moves the plunger 74 in the direction to decrease the open area of the outlet port 73 of the housing 71, until reaching a corresponding position at which the rate of fuel flow from the low-pressure pump 60 to the high-pressure pump 50 is equal to the target fuel supply rate.

The above-described fuel injection apparatus according to the present embodiment has the following advantages.

In the present embodiment, both the first and second functions are predefined prior to the installation of the fuel injection apparatus to the diesel engine. Accordingly, it is possible to properly define the second function through tests on the flow characteristics of the fuel supply unit P.

Consequently, it becomes possible for the ECU 3 to accurately correct the base target valve of the SCV current to secure the accuracy of the final target value of the same, thereby reliably bringing the actual fuel supply rate of the fuel supply unit P into agreement with the target fuel supply rate; accordingly, it also becomes possible for the ECU 3 to accurately and quickly control the fuel pressure in the accumulator 1.

After having described the fuel injection apparatus according to the present embodiment, a method of manufacturing the fuel injection apparatus as a member of a fuel injection apparatus group will be described hereinafter.

According to the present embodiment, the method includes the following steps.

First, the accumulator 1, the injectors 2, the fuel supply unit P, and the ECU 3 for each member of the group are prepared.

Secondly, the first function, which is to be used for all members of the group, is defined.

The first function can be represented by, for example, the line a-a in FIG. 3.

Thirdly, the solenoid-controlled valve 70 of the fuel supply unit P for each member of the group is tested on a test bench to determine the flow characteristics thereof.

Specifically, on the test bench, a sample low-pressure pump 60 and a sample high-pressure pump 50 have been mounted; the flow characteristics of both the sample pumps 60 and 50 have already been known. The solenoid-controlled valve 70 of the fuel supply unit P for each member of the group is then mounted on the test bench and tested to measure the change in the actual fuel supply rate of the fuel supply unit P, which is composed of the two sample pumps 60 and 50 and the solenoid-controlled valve 70, with change in the SCV current.

The measuring results can be represented by, for example, the line c-c in FIG. 3.

Fourthly, the second function for each member of the group is defined based on the determined flow characteristics of the solenoid-controlled valve 70 of the fuel supply unit P.

Specifically, for each member of the group, dI and dIS as shown in FIG. 3 are determined and the second function is then defined as (dI+dIS); As described previously, dI is constant irrespective of the target fuel supply rate and dIS varies with the target fuel supply rate.

Fifthly, for each member of the group, the defined second function is recorded on the outer surface of the fuel supply unit P.

Specifically, for each member of the group, the dI and dIS determined at the fourth step is recorded at a predetermined position on the outer surface of the solenoid-controlled valve 70.

Sixthly, for each member of the group, the defined first and second function is stored in the ECU 3.

Specifically, the ECU 3 stores therein the first function in the form of a map representing the first function. The dI recorded on the outer surface of the solenoid-controlled valve 70 is read and stored in the ECU 3; the dIS recorded on the outer surface of the solenoid-controlled valve 70 is read and stored in the ECU 3 in the form of a map representing the relationship between the target fuel supply rate and the dIS.

Finally, the accumulator 1, the injectors 2, the fuel supply unit P, and the ECU 3 are assembled together to form each member of the group.

Using the above method, it is possible to reliably and efficiently manufacture the fuel injection apparatus group each member of which has the previously-described advantages of the fuel injection apparatus according to the present embodiment.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, only the solenoid-controlled valve 70 of the fuel supply unit P for each member of the fuel injection apparatus group is tested, at the third step of the method, to determine the flow characteristics thereof; the second function for each member of the group is defined, at the fourth step of the method, based only on the determined flow characteristics of the solenoid-controlled valve 70.

However, at the third step of the method, it is also possible to further test the high-pressure pump 50 and the low-pressure pump 60 of the fuel supply unit P for each member of the group to determine the flow characteristics thereof.

In this case, a first sub-function can be defined, at the fourth step of the method, based on the determined flow characteristics of the high-pressure pump 50; a second sub-function can be defined, at the fourth step of the method, based on the determined flow characteristics of the solenoid-controlled valve 70; a third sub-function can be defined, at the fourth step of the method, based on the determined flow characteristics of the low-pressure pump 60; and the second function can be composed from the first, second, and third sub-functions.

In addition, the second function may also be composed from at least one of the first, second, and third sub-functions. Moreover, the first sub-function can be defined as the ratio of the actual discharge rate of the high-pressure pump 50 to the geometrical (or theoretical) discharge rate of the same, and the third sub-function can be defined as the ratio of the actual fuel pressure at the outlet of the low-pressure pump 60 to the reference (or theoretical) fuel pressure at the same place.

In the previous embodiment, the flow characteristics of the solenoid-controlled valve 70 of the fuel supply unit P for each member of the group is determined, at the third step of the method, by measuring the change in the actual fuel supply rate of the fuel supply unit P with change in the SCV current.

However, the flow characteristics of the solenoid-controlled valve 70 of the fuel supply unit P for each member of the group may also be determined, at the third step of the method, by measuring the change in a parameter which relates to the fuel supply rate of the fuel supply unit P with the change in the SCV current.

Such a parameter may be, for example, the opening degree of the solenoid-controlled valve 70 (i.e., the open area of the outlet port 73 of the solenoid-controlled valve 70) or the clearance between the plunger 51 and the cylinder 52 of the high-pressure pump 50 of the fuel supply unit P.

In the previous embodiment, the relief flow path 7 and the solenoid-controlled valve 8 is included in the fuel injection apparatus.

However, the fuel injection apparatus may also be configured without the relief flow path 7 and the solenoid-controlled valve 8.

Such modifications and variations are possible within the scope of the appended claims.

What is claimed is:

1. A method of manufacturing a group of fuel injection apparatuses, comprising:

(a) preparing an accumulator, at least one injector, a fuel supplier, and a controller for each member of the group, wherein:

the accumulator is employed to store therein pressurized fuel, the injector is employed to inject the pressurized fuel stored in the accumulator into a cylinder of an internal combustion engine, the fuel supplier is employed to supply the pressurized fuel to the accumulator, and the controller is employed to control a fuel supply rate of the fuel supplier through manipulation of a manipulated variable on which the fuel supply rate is dependant, the controller being configured to:

set a target fuel supply rate, determine a base target value of the manipulated variable as a first function of the target fuel supply rate, determine a correction value as a second function of the target fuel supply rate, correct the base target value of the manipulated variable using the correction value to obtain a final target value of the manipulated variable, and manipulate the manipulated variable to have the final target value, thereby bringing the fuel supply rate of the fuel supplier into agreement with the target fuel supply rate;

(b) defining the first function which is to be used for all members of the group;

(c) testing the fuel supplier for each member of the group to determine characteristics of the fuel supplier;

(d) defining, based on the determined characteristics of the fuel supplier, the second function for each member of the group;

(e) storing the defined first and second functions in the controller for each member of the group; and (f) assembling together the accumulator, the at least one injector, the fuel supplier, and the controller for each member of the group, wherein the fuel supplier for each member of the group comprises:

a high-pressure pump configured to be connected to the accumulator;

a low-pressure pump configured to be connected to a source of fuel; and a valve configured to be connected between the high-pressure and low-pressure pumps to change the fuel supply rate of the fuel supplier, wherein at the step (c), the high-pressure pump, the low-pressure pump; and the valve of the fuel supplier for each member of the group are severally tested at various operating conditions to determine characteristics thereof, and wherein at the step (d), a first sub-function is defined based on the determined characteristics of the high-pressure pump for each member of the group, a second sub-function is defined based on the determined characteristics of the low-pressure pump for each member of the group, a third sub-function is defined based on the determined characteristics of the valve for each member of the group, and the second function for each member of the group is composed of the first, second, and third sub-functions for each member of the group.

2. The manufacturing method as set forth in claim 1, further comprising, prior to the step (e), the step of recording the second function on an outer surface of the fuel supplier for each member of the group, and wherein the step (e) comprises reading the second function recorded on the outer surface of the fuel supplier and storing the read second function in the controller for each member of the group.

3. The manufacturing method as set forth in claim 1, wherein the valve of the fuel supplier for each member of the group comprises:

a hollow fixed member having an inlet port connected to the low-pressure pump and an outlet port connected to the high-pressure pump;

a movable member configured to be moved in the fixed member to change an opening degree of the valve; and a solenoid configured to generate, when supplied with electric current, an electromagnetic force to move the movable member, and wherein the controller is configured to control the fuel supply rate of the fuel supplier through manipulation of the electric current supplied to the solenoid.

4. The manufacturing method as set forth in claim 3, wherein at the step (c), the testing is performed, for each member of the group, by measuring change in the actual fuel supply rate of the fuel supplier with change in the electric current supplied to the solenoid of the valve.

5. The manufacturing method as set forth in claim 3, wherein at the step (c), the testing is performed, for each member of the group, by measuring change in the opening degree of the valve with change in the electric current supplied to the solenoid of the valve.

6. The manufacturing method as set forth in claim 1, wherein the high-pressure pump comprises:

a cylinder; and a plunger configured to reciprocate in the cylinder to pressurize fuel passing through the cylinder, and wherein, at the step (c), the testing is performed, for each member of the group, by measuring change in a clearance between the cylinder and the plunger with change in the manipulated variable.

7. The manufacturing method as set forth in claim 1, wherein at the step (e), for each member of the group, the first and second functions are each stored in the controller in the form of a map.

* * * * *